May 24, 1966  J. E. STODDARD  3,253,153
PHOTOSENSITIVE MEASURING SYSTEM WHICH CONVERTS A PHYSICAL
TO AN ELECTRICAL QUANTITY
Filed Jan. 16, 1963  2 Sheets-Sheet 1

INVENTOR
John E. Stoddard

BY *Spencer, Rockwell & Bartholow*
ATTORNEYS

May 24, 1966  J. E. STODDARD  3,253,153
PHOTOSENSITIVE MEASURING SYSTEM WHICH CONVERTS A PHYSICAL
TO AN ELECTRICAL QUANTITY
Filed Jan. 16, 1963  2 Sheets-Sheet 2

INVENTOR

John E. Stoddard

BY Spencer, Rockwell & Bartholow
ATTORNEYS

United States Patent Office 3,253,153
Patented May 24, 1966

3,253,153
PHOTOSENSITIVE MEASURING SYSTEM WHICH CONVERTS A PHYSICAL TO AN ELECTRICAL QUANTITY
John E. Stoddard, Avon, Conn., assignor to Pratt & Whitney Inc.
Filed Jan. 16, 1963, Ser. No. 251,857
11 Claims. (Cl. 250—237)

This invention relates to gauging and measuring systems and more particularly relates to such systems wherein measurement of a physical characteristic or dimensional displacement of an object is converted into an interpretable electrical quantity.

The invention contemplates the utilization of the timing circuits of relaxation oscillators of the type comprising a pair of switching devices which alternately switch between conducting and nonconducting states. Elements are provided in one or both of the timing circuits of the relaxation oscillator which vary in electrical value in response to a known stimulus and modify the conducting time of one or both of the switching devices proportional to the magnitude of the stimulus.

A measuring system embodying the invention may utilize a photo-sensitive device as a variable resistance in response to the intensity of light incident thereon to vary the time constant of a resistance-capacitance timing circuit of a relaxation oscillator proportional to the light intensity incident thereon. By making the light intensity incident upon the photo-sensitive device proportional to some physical quantity desired to be measured, the conducting times of the relaxation oscillator switching devices may be made proportional to the physical quantity desired to be measured.

Utilizing the same principal, many devices which exhibit change in an electrical quantity in response to some stimulus may be utilized in a measuring system embodying the invention to produce an electrical signal proportional to the magnitude of the stimulus.

This invention provides an electrical translating and indicating system which yields a highly accurate indication of a dimensional quantity, which utilizes but a small number of cooperating elements, and which is adaptable to many uses.

Accordingly, an object of this invention is to provide a new and improved gauging system wherein an electrical network has a variable output which may be utilized as an indication of a stimulus which varies a parameter of the network.

Another object of this invention is to provide a new and improved gauging or measuring system wherein a measurement of a physical dimension or a dimensional displacement is accurately translated to an electrical quantity indicative of the dimension or dimensional displacement.

A further object of this invention is to provide a new and improved gauging or measuring system utilizing a relaxation oscillator, such as a free-running multivibrator, to provide an average output signal indicative of the stimulus which affects the timing circuits of the oscillator.

A further object of this invention is to provide an electro optical gauging or measuring system wherein at least one photo-sensitive device is subjected to light intensity indicative of a physical dimension, where the photo-sensitive device is electrically connected in a timing circuit of a free-running multivibrator and varies the conducting time of one of the switching devices proportional to the dimension measured.

A still further object of this invention is to provide an electro-optical gauging or measuring system wherein, photo-sensitive devices are subjected to light intensities inversely proportional to a physical dimension and such photo-sensitive devices are included in the timing circuits of a free-running multivibrator and utilized therein as variable resistances to modulate the pulse duration of the output of the multivibrator in accordance with the light intensity incident upon the photo-sensitive devices.

The invention accordingly comprises the features of construction, the combinations of elements, and arrangement of parts which will be exemplified in the constructions hereinafter set forth. The scope of the invention will be indicated in the claims.

For a fuller understanding of the nature and objects of the invention, reference should be had to the following detailed description taken in connection with the accompanying drawings, in which.

Figure 1:
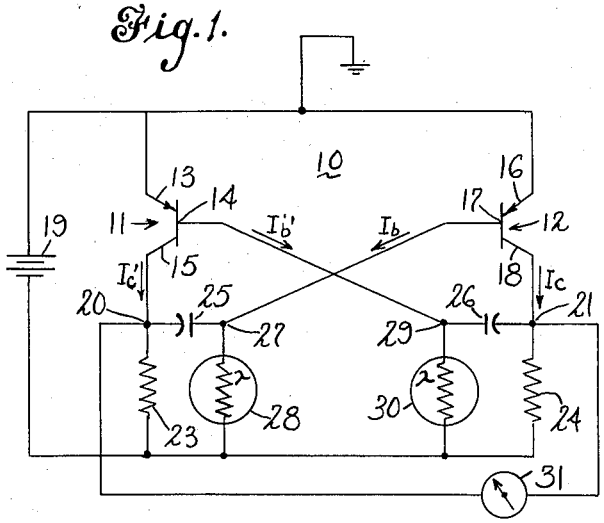
FIG. 1 is a schematic diagram of a multivibrator constructed in accordance with the invention.

A preferred embodiment of a relaxation oscillator constructed in accordance with the invention comprises a free-running multivibrator 10 comprising a pair of switching devices, transistors 11 and 12 which are operated in the switching mode. Transistor 11 has emitter, base and collector electrodes 13, 14 and 15, respectively, and transistor 12 has emitter, base and collector electrodes 16, 17 and 18, respectively. The emitters 16 and 13 are connected to a common source of unidirectional potential, such as a battery 19 having its positive terminal grounded. The collectors 15 and 18 are connected to terminal points 20 and 21, respectively. Connected between each of the terminal points 20 and 21 and line 22, connected to the negative terminal of battery 19, are load resistors 23 and 24, respectively. Load resistors 23 and 24 are preferably selected to be of equal resistance value. Terminal 20 is connected to base 17 of transistor 12 through a capacitor 25 and base 14 of transistor 11 is connected to terminal point 21 through a capacitor 26. Capacitors 25 and 26 are selected to be of equal values of capacitance. Connected between terminal point 27, intermediate capacitor 25 and base 17 and line 22, is a photo-resistor 28. Connected between terminal point 29 intermediate capacitor 26 and base 14 and line 22, is a photo-resistor 30.

The relaxation oscillator 10, with the exception of the photo-resistance elements, is a conventional resistance-capacitance coupled multivibrator of the free-running type and when the corresponding components comprising the timing circuits of each of the switching devices are of the same value, the output wave form taken from terminals 20 and 21 will be symmetrical and essentially rectangular in wave form.

Assuming the photo-resistors 28 and 30 are of fixed resistance value, consider now the operation of the circuit of FIG. 1. Assume that transistor 12 is starting to conduct toward a saturated condition (i.e., an increase in base current $I_b$ causes no increase in collector current $I_c$). As base current $I_b$ flows to point 27, current $I_b$ will divide with a portion of it flowing into capacitor 25 and a portion flowing to ground through resistance 28. The potential at point 27, with respect to ground, increases in accordance with the product of the resistance value of load resistance 23 and the capacitance value of capacitor 25 ($R_{23}C_{25}$). As the potential at point 27, with respect to ground, rises toward the potential of source 19, less the emitter-base potential drop of transistor 12, base current $I_b$ decreases, collector current $I_c$ will decrease resulting in a decrease in potential at point 21.

When transistor 12 commenced to conduct, the potential at point 21 suddenly increased from zero to essentially the potential of source 19 and this rapid change of potential was transmitted through capacitor 26 to base 14 of transistor 11. This raised the potential at base 14 essentially to that of source 19 and inasmuch as transistor 11 is of the PNP type, it was back biased and rendered nonconductive. Now when transistor 12 starts to turn off due to the potential at point 27 increasing towards the potential of source 19, the potential at point 21 starts to decrease towards the negative potential of battery 19 and this decrease is transmitted to base 14 of transistor 11 resulting in transistor 11 commencing to conduct base current $I_b'$, and hence collector current $I_c'$. As transistor 11 conducts collector curent $I_c'$, the potential at point 20, with respect to ground, increases toward the potential of source 19 which increase is transmitted through capacitor 25 to base 17 to further drive transistor 12 into cut-off.

It may thus be seen that the action of the transistors in switching from one conducting state to the other is cumulative or regenerative, and this switching action is extremely rapid.

When transistor 11 is conducting, a portion of the base current $I_b'$ will flow into capacitor 26, the remainder flowing to ground through resistance 30, and the potential at point 29 with respect to ground, will increase towards the potential of source 19 at a rate determined by the product of the capacitance value of capacitor 26 and the resistance value of load resistance 24 ($R_{24}C_{26}$) which is the same as the product $R_{23}C_{25}$.

Assuming that transistor 11 is conducting and transistor 12 is turned off, capacitor 25, as previously discussed, has charged to the extent that the potential at point 27, with respect to ground, is essentially equal to the potential at source 19. When transistor 12 is turned off, the charge which has built up on capacitor 25 due to current $I_b$ commences to leak off through resistance 28 at a rate determined by the product of the resistance value of resistance 28 and the capacitance value of capacitor 25 ($R_{28}C_{25}$) and the potential at point 27 with respect to ground will decrease at a rate determined by $R_{28}C_{25}$.

When the potential at point 27, with respect to ground, has decreased to a value which will allow base current $I_b$ to flow from base 17 of transistor 12, transistor 12 will commence to conduct collector current $I_c$, the potential at point 21 with respect to ground will begin to increase, and the potential at base 14 will begin to increase, tending to turn off transistor 11. The potential at point 20 will therefore decrease, causing a resulting decrease in potential at base 17 resulting in the triggering ON of transistor 12. The above-described action is cumulative and the transistors switch conducting states, i.e., from saturation to nonconduction and vice versa.

In a like manner, when transistor 11 is nonconductive and transistor 12 is conducting, as capacitor 26 discharges through resistance 30 at a rate determined by the product of the capacitance value of capacitor 26 and a resistance 30 ($R_{30}C_{26}$). The voltage at point 29 decreases in accordance with this RC product and transistor 11 will switch on when the potential at point 29, with respect to ground, decreases to a value which forward biases base 14 of transistor 11. It is therefore seen that the ON or conducting time of transistor 12 is determined by the product or time constant $R_{28}C_{25}$ and the ON or conducting time of transistor 11 is determined by the product or time constant $R_{30}C_{26}$.

It is thus apparent that by varying the value of resistance 28, the OFF time of transistor 12 may be controlled, by varying the value of resistance 30 the OFF time of transistor 11 may be controlled. Inasmuch as the transistors 11 and 12 are operated in the switching mode, the voltages appearing across resistors 23 and 24 are essentially rectangular in form.

In accordance with one aspect of the invention, the multivibrator 10 is provided with matched photo-sensitive elements which vary in effective resistance value dependent on the light intensity incident thereupon.

Figure 2:
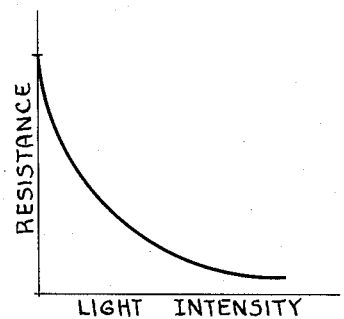
FIG. 2 is a typical characteristic of a photo-resistance element utilized in the multivibrator of FIG. 1.

The photo-resistor elements 28 and 30 will conduct current proportional to the light intensity incident thereupon, as illustrated by the typical characteristic of FIG. 2. It will be noted that the effective resistance value of the photo-resistors decreases with light intensity incident thereupon. Therefore, the conducting times of each of the transistors 11 and 12 may be varied by varying the light intensity incident upon photo-resistors 28 and 30. When the light intensities incident upon the photo-resistors are unequal, the output waveform across load resistors 23 and 24 is asymmetrical.

An average reading meter 31 of the d'Arvonsal type connected across terminals 20 and 21 will indicate a net current proportional to the conducting times of the transistors 11 and 12.

Figure 3:
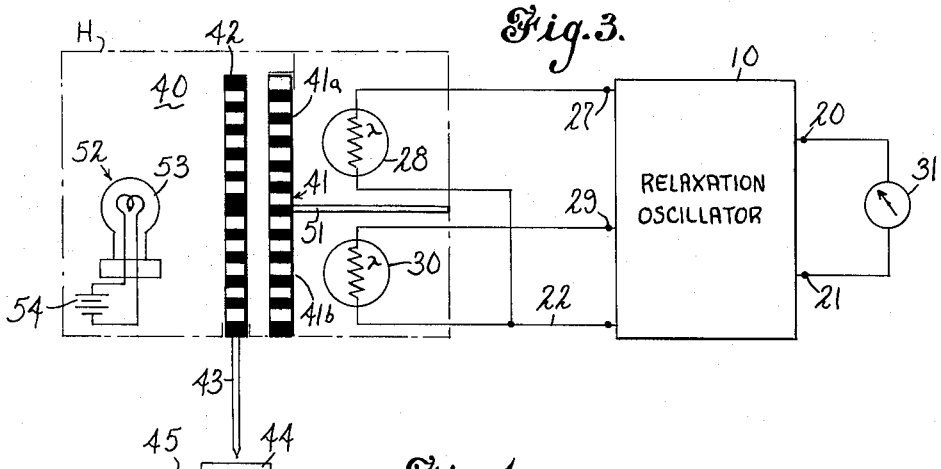
FIG. 3 illustrates, partly in block form, a measuring or gauging system embodying the invention and utilizing the multivibrator of FIG. 1.
Figure 4:
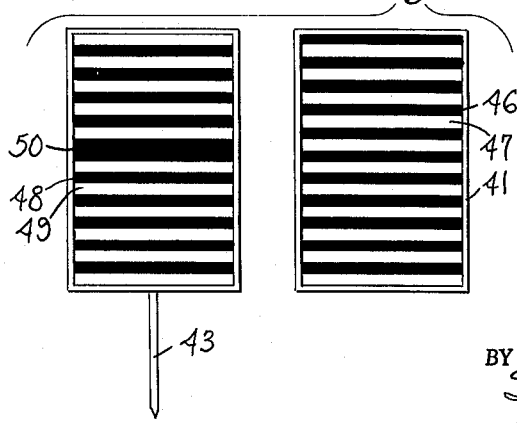
FIG. 4 illustrates optical gratings used in the system of FIG. 3.

Reference is now made to FIG. 3, which illustrates an electro-optical gauging or measuring system 40 embodying the invention, and utilizing the relaxation oscillator 10, shown in block form. The system 40 comprises a stationary grating 41 in sliding contact or close proximity to a movable grating 42. Movable grating 42 has a probe 43 attached thereto, adapted to contact an object 44 on a reference plane 45 to determine the height of the upper surface of the object 44 above the reference plane 45. Grating 41 has sections 41a and 41b, each having alternate opaque bands 46 and transparent bands 47 of equal width (FIG. 4). Grating 42, has alternate opaque bands 48 and transparent bands 49 of equal width and of equal width to bands 46 and 47. Grating 42 additionally has an opaque band 50 of twice the width of a band 46 and 47. In accordance with the invention, the grating 42 is arranged to have opaque bands 48 which are aligned with opaque bands 46 of section 41b and aligned with transparent bands of section 41a. It is to be understood that the band arrangement of the gratings could be reversed. A shield 51 extends from the center of grating 41 intermediate photo-resistors 28 and 30, to prevent either one of the photo-resistors from having an effect on the other or light through one section of grating 41 from falling upon the photo-resistor associated with the other section. The opaque bands of gratings 41 and 42 are aligned in front of one photo-resistor while the opaque bands of grating portion 41a and transparent bands of gratings 42 are aligned in front of photo-resistor 28.

The light emanating from light source 52, illustrated as comprising a lamp 53 energized from a source of potential 54, will pass through the aligned transparent bands of movable grating 42 and section 41b of stationary grating 41. The opaque bands of grating 42 will block transmission of light through the transparent bands of section 41b of stationary grating 41. With reference to FIG. 2, it may be seen that the effective resistance of photo-resistor 30 between point 29 and line 22 will be substantially less than the effective resistance of photo-electric cell 28 between point 27 and line 22. Therefore, the time constant of the timing circuit including photo-resistor 28 in the base circuit of transistor 12 will be substantially longer than the time constant of the timing circuit in the base circuit of transistor 11. Thus, transistor 11 will conduct collector current, a major portion of a complete cycle of multivibrator 10. This will result in a net current flowing from terminal point 20, through meter 31 and load resistor 24 to line 22. The averaging-type meter 31 may be adjusted to give a zero reading under the conditions just described.

Assume that the probe attached to movable grating 42 is moved toward the upper surface of object 44 to gauge the distance between the upper surface of object 44 and reference plane 45. The transparent bands 49 of movable grating 42, opposite section 41a of stationary grating 41 will move towards alignment with the transparent bands 47 of stationary grating section 41a, and the opaque bands 48 of movable grating 42 will move towards alignment with the transparent bands 47 of stationary grating section 41b. The effect of such movement of grating 42 is to increase the intensity of the light transmitted by the gratings on photo-resistor 28, and decrease the intensity of the light transmitted to photo-resistor 30.

Figure 5:
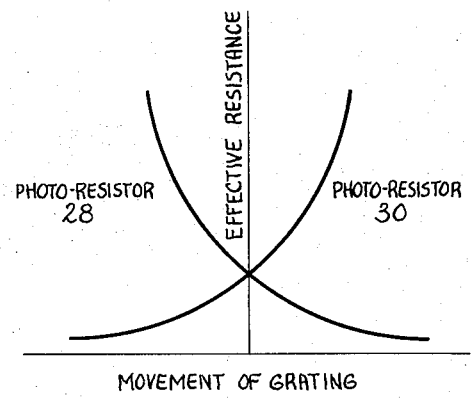
FIG. 5 is illustrative of the responsive of the photoresistance elements with relative movement of the gratings of FIG. 4.

The change in light intensity incident upon photo-resistors 28 and 30 will decrease the time constant of the timing circuit comprising capacitor 25 and the effective resistance of photo-resistor 28 and increase the time constant of the timing circuit comprising capacitor 26 and the effective resistance of photo-resistor 30, inasmuch as the effective resistance of photo-resistor 30 is decreasing while the effective resistance of photo-resistor 28 is increasing. This is more clearly illustrated by the plot of effective resistance of the photo-resistors 28 and 30 versus movement of grating 42, as shown in FIG. 5. As a further result of such movement, the conducting time of transistor 12 will increase while the conducting time of transistor 11 will decrease during a cycle of operation of the multivibrator 10, which will change the net current through meter 31. It may thus be seen, that the system arrangement of FIG. 3 is such that movement of grating 42 effects photo-resistors 28 and 30 inversely and provides a push-pull effect on the switching devices of multivibrator 10.

Figure 6:
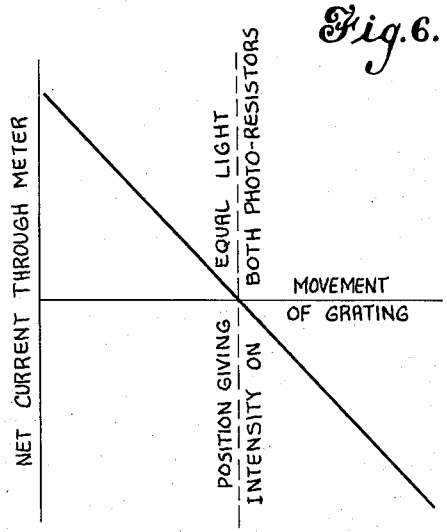
FIG. 6 is illustrative of the electrical output of the multivibrator of FIG. 1 in response to relative movement of the gratings of FIG. 4.

The resultant current through meter 31 varies essentially linearly with movement of grating 42 as shown in FIG. 6. The resultant current through meter 31 may mathematically be shown to be:

$$I_T = \frac{R_{28} - R_{30}}{R_{28} + R_{30}} \quad (1)$$

where:

$I_T$=net current through meter 21
$R_{28}$=effective resistance of photo-resistor 28
$R_{30}$=effective resistance of photo-resistor 30 let
$$T_1 = KR_{28}C_{25} \quad (2)$$
$$T_2 = KR_{30}C_{26} \quad (3)$$
$$T_T = T_1 + T_2 \quad (4)$$

where:

$T_1$=conducting time of transistor 12
$T_2$=conducting time of transistor 11
$T_T$=time of one cycle of multivibrator 10
$K$=a constant and $$I_1 = \frac{V}{R_M + R_{23}} \cdot \frac{T_1}{T_T} \quad (5)$$

$$I_2 = \frac{V}{R_M + R_{24}} \cdot \frac{T_2}{T_T} \quad (6)$$

where:

$R_M$=resistance of meter 31
$R_{23}$=resistance of resistor 23
$R_{24}$=resistance of resistor 24
$V$=potential of source 19
$I_1$=current through meter from transistor 12
$I_2$=current through meter from transistor 11 since $R_{23} = R_{24}$ and $$I_T = I_1 - I_2 \quad (7)$$

$$I_T = K_1 \left[ \frac{T_1}{T_T} - \frac{T_2}{T_T} \right] \quad (8)$$

where $K_1$ is a constant then $$I_T = K_1 \left[ \frac{KR_{28}C_{25} - KR_{30}C_{26}}{KR_{28}C_{25} + KR_{30}C_{26}} \right] \quad (9)$$

Since $C_{25} = C_{26}$, by factoring out the constants K and the capacitances $$I_T = K_1 \frac{R_{28} - R_{30}}{R_{28} + R_{30}} \quad (10)$$

It will be noted from FIG. 5, which illustrates curves of the change in the effective resistance of the photo-resistors with grating displacement, that the resistances of the photo-resistors vary inversely with grating displacement. Also, it may be noted from FIG. 6, that the net current through meter 31 varies essentially linearly with movement of the gratings.

The invention as thus far disclosed teaches the use of photo-resistor elements 28 and 30 in the timing circuits of multivibrator. However, other photo-sensitive devices may be utilized which serve the same function. For example, photo-voltaic cells might be utilized in place of photo-resistors. However, the maximum resistance of a photo-resistor or the maximum voltage generated across a photo-voltaic cell should not exceed a value which would prevent conduction of the associated transistor in a saturated state.

The bands of gratings 41 and 42 have been illustrated as parallel, however the bands of the gratings may be contoured in accordance with a predetermined function to compensate for any non-linearites in a particular system. For example, some compensation may be required dependent on the characteristics of the photo-sensitive elements used.

It will be understood that the photo-resistors, gratings and light source will be suitably enclosed in a housing member, generally indicated by the dashed block H to prevent light other than that emanating from source 52 from being incident on the photo-resistors.

Figure 7:
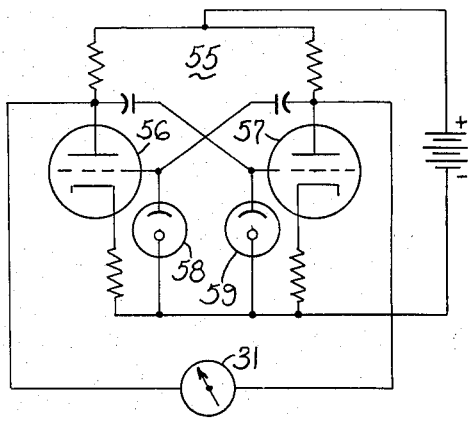
FIG. 7 is a schematic diagram of another multivibrator, similar to that of FIG. 1, constructed in accordance with the invention.

Another relaxation oscillator 55 constructed in accordance with the invention is illustrated in FIG. 7. The relaxation oscillator 55 utilizes vacuum tubes 56 and 57 as switching elements and photo-electric cells or tubes 58 and 59 in each timing circuit. The construction of relaxation oscillator 55 is apparent and the operation thereof will be understood by one skilled in the art, in view of the explanation of the operation of relaxation oscillator 10. Relaxation oscillator 55 may be substituted for relaxation oscillator 10 in the gauging system of FIG. 3.

Figure 8:
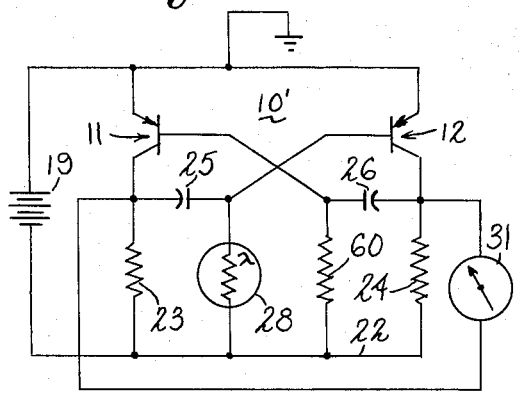
FIG. 8 is a schematic diagram of a further relaxation oscillator constructed in accordance with the invention.

FIG. 8 illustrates another gauging system embodying the invention and utilizing a multivibrator 10'. In FIG. 8 equivalent elements to those of multivibrator 10 of FIG. 1 bear like reference numerals. In multivibrator 10', photo-resistor 30 of multi-vibrator 10 of FIG. 1 is replaced by a fixed resistance 60. In this modification of the invention, the conducting time of transistor 11 will be determined by capacitor 26 and resistance 60, while the conducting time of transistor 12 will be determined by capacitor 25 and the effective resistance of photo-resistor 28, and hence the light intensity incident upon photo-resistor 28.

Figure 9:
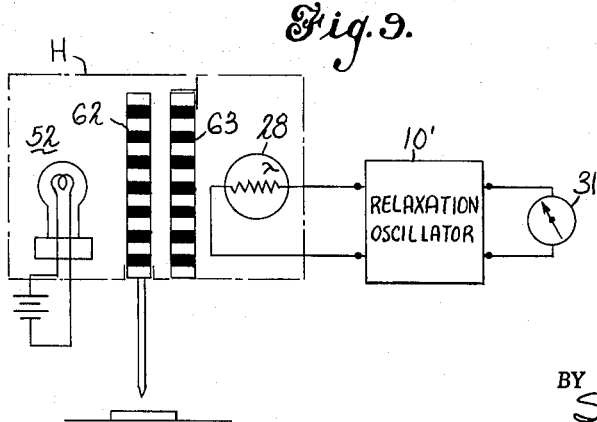
FIG. 9 illustrates, partly in block form, a measuring or gauging system embodying the invention and utilizing the multivibrator of FIG. 8.

The multivibrator of FIG. 8 may be utilized in the detection or gauging system shown in FIG. 9, in which the intensity of light incident upon the photo-resistor 28 is dependent upon the position of a movable grating 62 with respect to a stationary grating 63. Each of the gratings, 62 and 63, have alternate opaque bands and transparent bands of equal dimension, as illustrated, and the movable grating 62 is illustrated as having a plunger or probe 64 thereon adapted to contact the upper surface of an object 65 above a reference plane 66.

As grating 62 moves in a vertical plane, the transparent bands in gratings 62 and 63 move out of alignment and the intensity of the light transmitted therethrough from source 52 decreases, thereby increasing the effective resistance of photo-resistor 28 and decreasing the conducting time of transistor 12. This change in conducting time of transistor 12 varies the net current through meter 31 in accordance with the intensity of light incident upon the photo-resistor 28.

The movement of meter 31 in response to a change in net current will not have the linearity of the meter movement 31, inasmuch as the relaxation oscillator 10' does not have the push-pull operation of a relaxation oscillator utilizing a pair of photo-sensitive devices which are inversely responsive to movement of the movable grating. However, compensation for this lack of linearity may be made by suitable calibration of the scale of meter 31, or contouring of the bands of gratings 62 and 63.

It may be seen that the objects of the invention set forth, as well as those made apparent from the foregoing description are efficiently attained. While embodiments of the invention have been disclosed in which the parameters of the timing circuits of a relaxation oscillator are varied in response to a light stimulus, it will be apparent that the invention may be embodied in measuring and gauging systems in which the parameters of the timing circuits are varied in response to other stimuli; and while preferred embodiments of the invention have been illustrated and described for purposes of disclosure, modifications to the disclosed embodiments as well as other embodiments of the invention may occur to those skilled in the art. Accordingly, it is intended to cover in the appended claims, all modifications and embodiments of the invention which do not depart from the spirit and scope of the invention.

What is claimed is:

1. A gauging system comprising, a stationary grating having alternate opaque and transparent bands, said stationary grating having first and second sections; a movable grating having alternate opaque and transparent bands, the bands of one of said gratings being arranged such that as said movable grating moves with respect to said stationary grating the opaque bands of said movable grating move toward alignment with the opaque bands of one of said stationary grating sections and toward alignment with the transparent bands of the other of said stationary grating sections; a normally symmetrical relaxation oscillator comprising a pair of switching devices connectable to a source of unidirectional potential; each of said switching devices having a timing circuit controlling the conducting time of a respective switching device; photo-sensitive elements in each of said timing circuits having an effective resistance value variable in response to the intensity of light incident thereupon, each of said photo-sensitive elements being positioned behind one of said stationary grating sections whereby light transmitted through said gratings and incident upon said photo-sensitive elements varies the effective resistance of said photo-sensitive elements inversely with movement of said movable grating, the effective resistance of each of said photo-sensitive elements controlling the time of conduction of an associated one of said switching devices; and means for averaging the conducting times of each of said switching devices.

2. The metering system of claim 1 wherein said photo-sensitive elements are photo-resistor elements and said switching devices are transistors.

3. The metering system of claim 1 wherein said photo-sensitive elements are photo-electric cells and said switching devices are vacuum tubes.

4. A gauging system comprising, a stationary grating having alternate opaque and transparent bands, said stationary gratings having first and second sections with light shielding means therebetween; a movable grating having alternate opaque and transparent bands, the bands of one of said gratings being arranged such that as said movable grating moves with respect to said stationary grating the opaque bands of said movable grating move toward alignment with the opaque bands of one of said stationary grating sections and toward alignment with the transparent bands of the other of said stationary grating sections; a normally symmetrical relaxation oscillator comprising a pair of switching devices connectable to a source of unidirectional potential; each of said switching devices having a timing circuit controlling the conducting time of a respective switching device; a light source; photo-sensitive elements in each of said timing circuits having an effective resistance value variable in response to the intensity of light emanating from said light source and incident thereupon, each of said photo-sensitive elements being positioned behind one of said stationary grating sections whereby light transmitted through said gratings and incident upon said photo-sensitive elements varies the effective resistance of said photo-sensitive elements inversely with movement of said movable grating, the effective resistance of each of said photo-sensitive elements controlling the time of conduction of an associated one of said switching devices; and means for averaging the conducting times of each of said switching devices.

5. A metering system comprising, a normally symmetrical relaxation oscillator comprising a pair of switching devices connectable to a source of unidirectional potential; each of said switching devices having a timing circuit controlling the conducting time of a respective one of said switching devices; resistance means in each of said timing circuits having a resistance value variable in response to a predetermined stimulus, said resistance means being arranged to be inversely responsive to said stimulus with respect to each other whereby the conducting time of each of said switching devices is proportional to the response of the associated resistance means to the stimulus; and means for averaging the conducting times of said switching devices.

6. A metering system comprising, a relaxation oscillator including a pair of switching devices connectable to a source of unidirectional potential; each of said switching devices having a timing circuit controlling the conducting time of a respective one of said switching devices; resistance means in each of said timing circuits having a resistance value variable in response to a predetermined stimulus, said resistance means being arranged to be responsive to said stimulus whereby the conducting time of each of said switching devices is proportional to the response of the associated resistance means to the stimulus, and means for averaging the conducting times of said switching devices.

7. The system of claim 6 wherein said resistance means are photo-sensitive and vary in effective resistance value in response to intensity of light incident thereupon.

8. A metering system comprising, a relaxation oscillator including a pair of switching devices connectable to a source of unidirectional potential, each of said switching devices having a timing circuit controlling the conducting time of said switching device, a resistance means in each of said timing circuits, at least one of said resistance means having an effective resistance value variable in response to a predetermined stimulus; and means for averaging the conducting times of said switching devices.

9. A metering system comprising, a normally symmetrical relaxation oscillator comprising a pair of switching devices connectable to a source of unidirectional potential; each of said switching devices having a timing circuit controlling the conducting time of said switching device; resistance means in each of said timing circuits, at least one of said resistance means having an effective resistance value variable in response to a predetermined stimulus to vary the conducting time of an associated switching device in response to the effect of the stimulus thereon; and means for averaging the conducting times of said switching devices.

10. A gauging system comprising, a stationary grating having alternate opaque and transparent bands; a movable grating having similar alternate opaque and transparent bands; the bands of said gratings being arranged such that as said movable grating moves with respect to said stationary grating the opaque bands of said movable grating move toward alignment with the opaque bands or the transparent bands of said stationary grating to control the transmission of light through said stationary grating in accordance with the position of said movable grating; a relaxation oscillator comprising a pair of switching devices connectable to a source of unidirectional potential; each of said switching devices having a timing circuit controlling the conducting time of said switching devices; a photo-sensitive element in at least one of said timing circuits having an effective resistance value variable in response to the intensity of light incident thereupon, said at least one photo-sensitive element being positioned behind said stationary grating to measure the intensity of light transmitted therethrough and vary the effective resistance of said at least one photo-sensitive element to control the time of conduction of at least one of said switching devices; and means for averaging the conducting times of each of said switching devices.

11. A metering system comprising a stationary grating having alternate opaque and transparent bands, said stationary grating having first and second sections and shielding means therebetween to isolate light transmitted through one section from light transmitted through the other section, a movable grating movable parallel to said stationary grating, said movable grating having alternate opaque and transparent bands arranged to align with the opaque and transparent bands respectively of one section of said stationary grating and alternate and transparent and opaque bands arranged to align with the opaque and transparent bands respectively of the other section of said stationary grating, a light source disposed adjacent said movable grating arranged to transmit light through said gratings and first and second light sensing means disposed on opposite sides of said shielding means behind said stationary grating for sensing the intensity of light transmitted through each of said sections.

References Cited by the Examiner

UNITED STATES PATENTS

| | | | |
|---|---|---|---|
| 2,760,137 | 8/1956 | Andrews | 331—66 X |
| 2,945,959 | 7/1960 | Atkinson | 250—237 |
| 2,948,890 | 8/1960 | Barth et al. | 88—14 |
| 2,984,729 | 5/1961 | Hykes et al. | 331—66 X |
| 3,114,046 | 12/1963 | Cabaniss et al. | 250—237 |
| 3,128,412 | 4/1964 | Abromaitis | 331—66 X |

RALPH G. NILSON, *Primary Examiner.*

WALTER STOLWEIN, *Examiner.*